(12) United States Patent
Kocol (10) Patent No.: US 12,189,501 B2
(45) Date of Patent: Jan. 7, 2025

(54) MECHANISM FOR INCREASING DATA PROTECTION IN STORAGE FAILURE SCENARIOS

(71) Applicant: Samsung Electronics Co., Ltd., Gyeonggi-do (KR)

(72) Inventor: Sean Christopher Kocol, Vista, CA (US)

(73) Assignee: Samsung Electronics Co., Ltd. (KR)

( * ) Notice: Subject to any disclaimer, the term of this patent is extended or adjusted under 35 U.S.C. 154(b) by 174 days.

(21) Appl. No.: 18/077,298

(22) Filed: Dec. 8, 2022

(65) Prior Publication Data

US 2024/0086287 A1    Mar. 14, 2024

Related U.S. Application Data (60) Provisional application No. 63/405,035, filed on Sep. 9, 2022.

(51) Int. Cl.
     *G06F 11/16*          (2006.01)
     *G06F 11/20*          (2006.01)

(52) U.S. Cl.
     CPC ...... *G06F 11/1662* (2013.01); *G06F 11/2097* (2013.01); *G06F 11/2041* (2013.01)

(58) Field of Classification Search
     CPC .... G06F 3/0617; G06F 3/067; G06F 11/1662; G06F 11/1666; G06F 11/2097; G06F 11/2041
See application file for complete search history.

(56) References Cited

U.S. PATENT DOCUMENTS

| | | | |
|---|---|---|---|
| 8,554,951 B2 * | 10/2013 | Barton | G06F 3/0671 713/400 |
| 10,067,998 B2 * | 9/2018 | Abhijeet | G06F 3/067 |
| 11,169,706 B2 | 11/2021 | Memon et al. | |
| 2018/0004452 A1 | 1/2018 | Ganguli et al. | |
| 2019/0356609 A1 | 11/2019 | Grunwald et al. | |
| 2022/0027051 A1 | 1/2022 | Kant et al. | |
| 2022/0083245 A1 | 3/2022 | Kant et al. | |

FOREIGN PATENT DOCUMENTS

| | | |
|---|---|---|
| CN | 104573020 | 11/2017 |
| CN | 109196459 | 12/2020 |
| WO | WO 2021/109589 | 6/2021 |

OTHER PUBLICATIONS

European Search Report dated Dec. 19, 2023 issued in counterpart application No. 23195292.0-1224, 11 pages.

* cited by examiner

*Primary Examiner* — Joseph R Kudirka
(74) *Attorney, Agent, or Firm* — The Farrell Law Firm, P.C.

(57) ABSTRACT

A method includes generating a new storage target assignment for a placement group (PG) as a last started set, the PG including the last started set and a last clean set, wherein the last started set includes a current set of storage targets assigned for the PG, and the last clean set includes a set of storage targets assigned for the PG at the last time all data stores in its acting set of storage targets were online and up-to-date; performing a process to rebalance or add new data stores in the last started set; storing one or more of the new data stores in a supplemental clean list; and performing one or more update operations on the last started set, based on the supplemental clean list.

20 Claims, 7 Drawing Sheets

MECHANISM FOR INCREASING DATA PROTECTION IN STORAGE FAILURE SCENARIOS

PRIORITY

This application is based on and claims priority under 35 U.S.C. § 119(e) to U.S. Provisional Patent Application No. 63/405,035, filed on Sep. 9, 2022, in the United States Patent and Trademark Office, the entire contents of which are incorporated herein by reference.

FIELD

The present disclosure relates generally to memory object storage systems.

BACKGROUND

In object storage systems, groups of objects, called placement groups (PGs), may be assigned to sets of storage targets. A set of assigned storage targets is known as a PG's "acting set".

The acting set of storage targets of a PG may be determined by a consistent hashing algorithm. For example, controlled replication under scalable hashing (CRUSH) may be used to assign PGs to acting sets.

A pool is a collection of PGs with the same data protection strategy (e.g., each PG in a pool may have 3 data targets), and with different acting sets of storage targets (e.g., some objects in each PG may be assigned to different data targets). Pools may be used to distribute data across many different acting sets.

When a storage failure occurs, PGs with offline data stores (e.g., data storage locations) in their acting sets may be assigned to new acting sets with online data stores. However, when multiple storage failures occur within a short time period, it is possible for all storage targets in an acting set to become unavailable, which may result in data loss.

SUMMARY

The present disclosure has been made to address at least the disadvantages described above and to provide at least the advantages described below.

According to an aspect of the disclosure, a method includes generating a new storage target assignment for a PG as a last started set, the PG including the last started set and a last clean set, wherein the last started set includes a current set of storage targets assigned for the PG, and the last clean set includes a set of storage targets assigned for the PG at the last time all data stores in its acting set of storage targets were online and up-to-date; performing a process to rebalance or add new data stores in the last started set; storing one or more of the new data stores in a supplemental clean list; and performing one or more update operations on the last started set, based on the supplemental clean list.

According to another aspect of the disclosure, a system includes a memory and a controller configured to generate a new storage target assignment for a PG as a last started set, the PG including the last started set and a last clean set, wherein the last started set includes a current set of storage targets assigned for the PG, and the last clean set includes a set of storage targets assigned for the PG at the last time all data stores in its acting set of storage targets were online and up-to-date; perform a process to rebalance or add new data stores in the last started set; store one or more of the new data stores in a supplemental clean list; and perform one or more update operations on the last started set, based on the supplemental clean list.

According to another aspect of the disclosure, an electronic device includes a memory configured to store instructions, and a processor configured to execute the instructions. The instructions, when executed cause the electronic device to generate a new storage target assignment for a PG as a last started set, the PG including the last started set and a last clean set, wherein the last started set includes a current set of storage targets assigned for the PG, and the last clean set includes a set of storage targets assigned for the PG at the last time all data stores in its acting set of storage targets were online and up-to-date; perform a process to rebalance or add new data stores in the last started set; store one or more of the new data stores in a supplemental clean list; and perform one or more update operations on the last started set, based on the supplemental clean list.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure.

In addition, descriptions of well-known functions and constructions are omitted for clarity and conciseness. The terms described below are terms defined in consideration of the functions in the present disclosure, and may be different according to users, intentions of the users, or customs.

Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices utilizing storage devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

A PG may have 2 storage target assignments. A "last clean" set may be the set of storage targets assigned for the PG at the last time all data stores in its acting set were online and the latest versions (e.g., the most recently written) of all objects belonging to that PG are stored on that data store. A "last started" set may be the current set of storage targets assigned for the PG. When a PG is "clean" (e.g., when the PG doesn't have any failed data stores in it), the "last clean" set may be the same as the "last started" set. The expression "up-to-date" may be used to describe a data store in which the latest versions of all objects belonging to a given PG are stored on that data store.

When multiple storage failures occur in a short period of time, it is possible for the assignment of the "last started" set to have worse data protection (fewer online storage targets assigned to a given PG) than the assignment of the "last clean" set.

Figure 1:
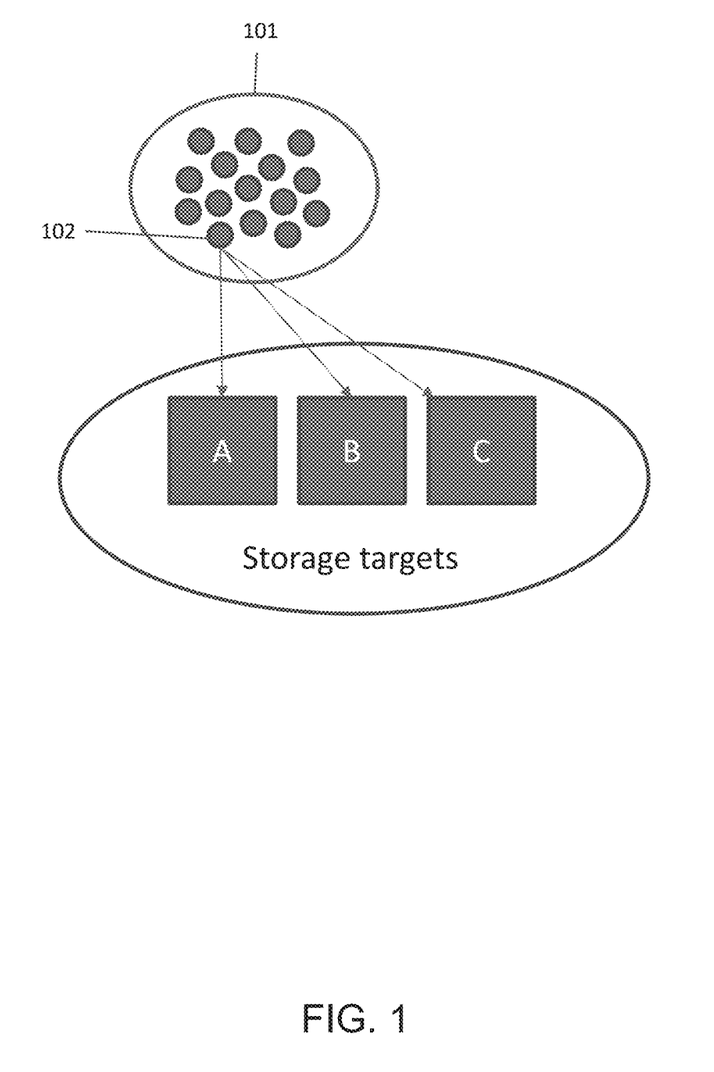
FIG. 1 illustrates a concept in an object storage system, according to an embodiment.

FIG. 1 illustrates a concept in an object storage system, according to an embodiment.

Referring to FIG. 1, a PG 101 has an acting set of storage targets [A,B,C]. A storage target may be a memory device such as a solid state drive (SSD), for example. To increase data durability, each object 102 in a PG may have data written to each storage target in its acting set.

For example, each object 102 in a PG may be copied to a predetermined number of (e.g., 3) different data stores (e.g., in different failure domains). The data stores may be located at different physical locations. Thus, even if 2 data stores are lost, a loss of data may be prevented.

Figure 2A:
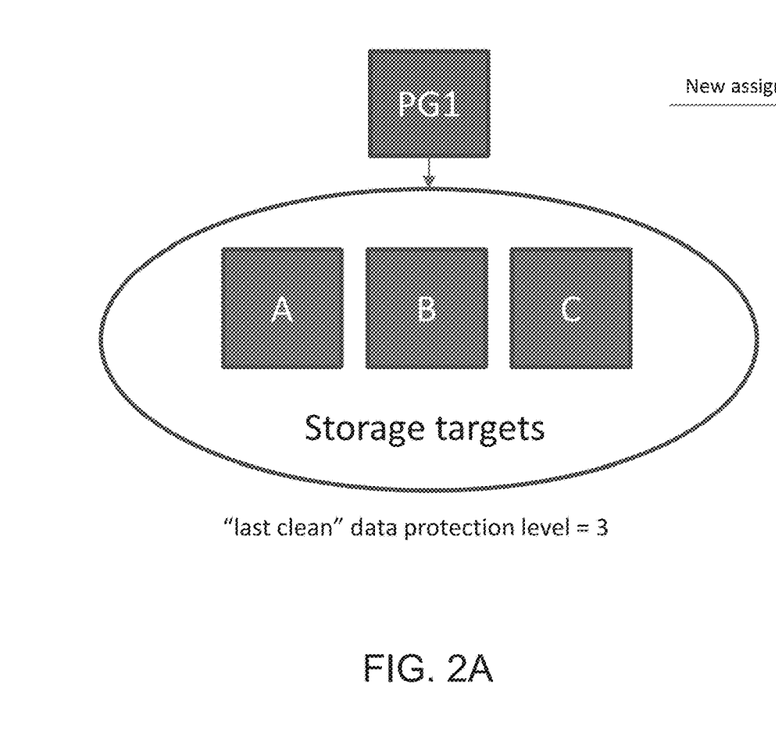
FIGS. 2A-2B illustrate a situation in which a "last started" set has worse data protection than a "last clean" set, according to an embodiment.
Figure 2B:
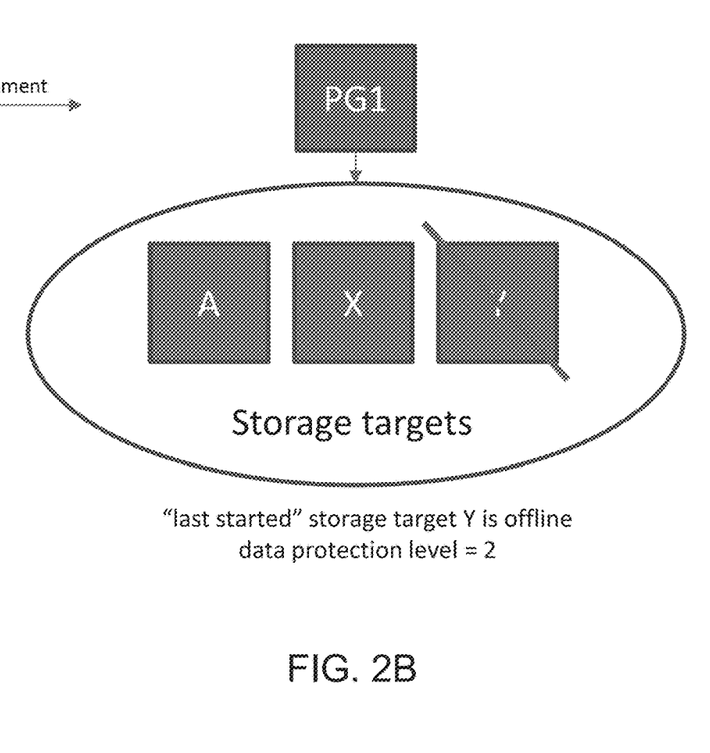

FIGS. 2A-2B illustrate a situation in which a "last started" set has worse data protection than a "last clean" set, according to an embodiment.

Referring to FIGS. 2A-2B, a PG1 has an existing assignment of storage targets [A,B,C]. The PG1 then gets new assignment storage targets, such as [A,X,Y]. At some point (e.g., while copying data from known data stores to new data stores (this may also be referred to as "rebalancing")), one of the added data stores (e.g., Y) may go offline. In that case, when rebalancing is completed, the PG1 would accept the new assignment and have a lower data protection level of 2 data stores, rather than a desired data protection level of 3 data stores.

However, instead of accepting the new assignment (by assigning the "last started" data store set to the "last clean" data store set), thereby lowering the data protection level, one or more storage targets in the new assignment may be recorded as "clean" (e.g., up-to-date) using a supplemental clean list.

Figure 3:
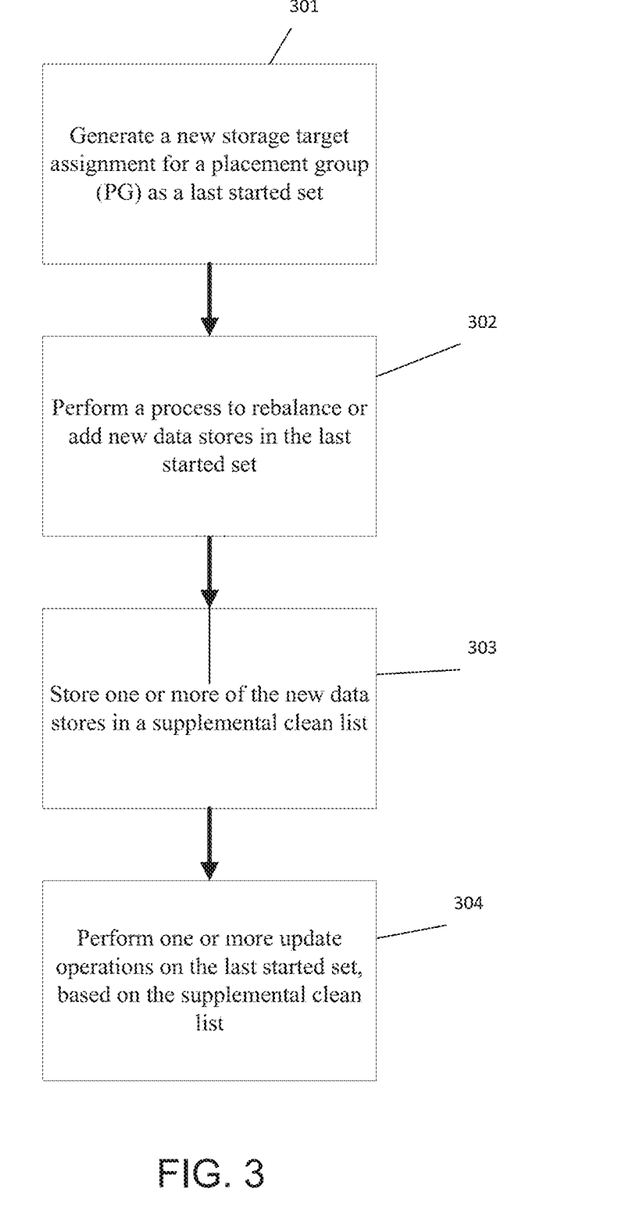
FIG. 3 illustrates a flowchart for assigning a storage target using a supplemental clean list, according to an embodiment.

FIG. 3 illustrates a flowchart for assigning a storage target using a supplemental clean list, according to an embodiment.

Referring to FIG. 3, at step 301, a new storage target assignment for a PG is generated as a last started set. The PG may include the last started set and a last clean set. The last started set may include a current set of storage targets assigned for the PG, and the last clean set may include a set of storage targets assigned for the PG at a last time all data stores in its acting set of storage targets were online and up-to-date (e.g., at the last time all data stores in its acting set of storage targets were online and up-to-date).

At step 302, a process to rebalance or add new data stores in the last started set is performed.

At step 303, one or more of the new data stores are stored in a supplemental clean list.

At step 304, one or more update operations on the last started set are performed based on the supplemental clean list.

Figure 4:
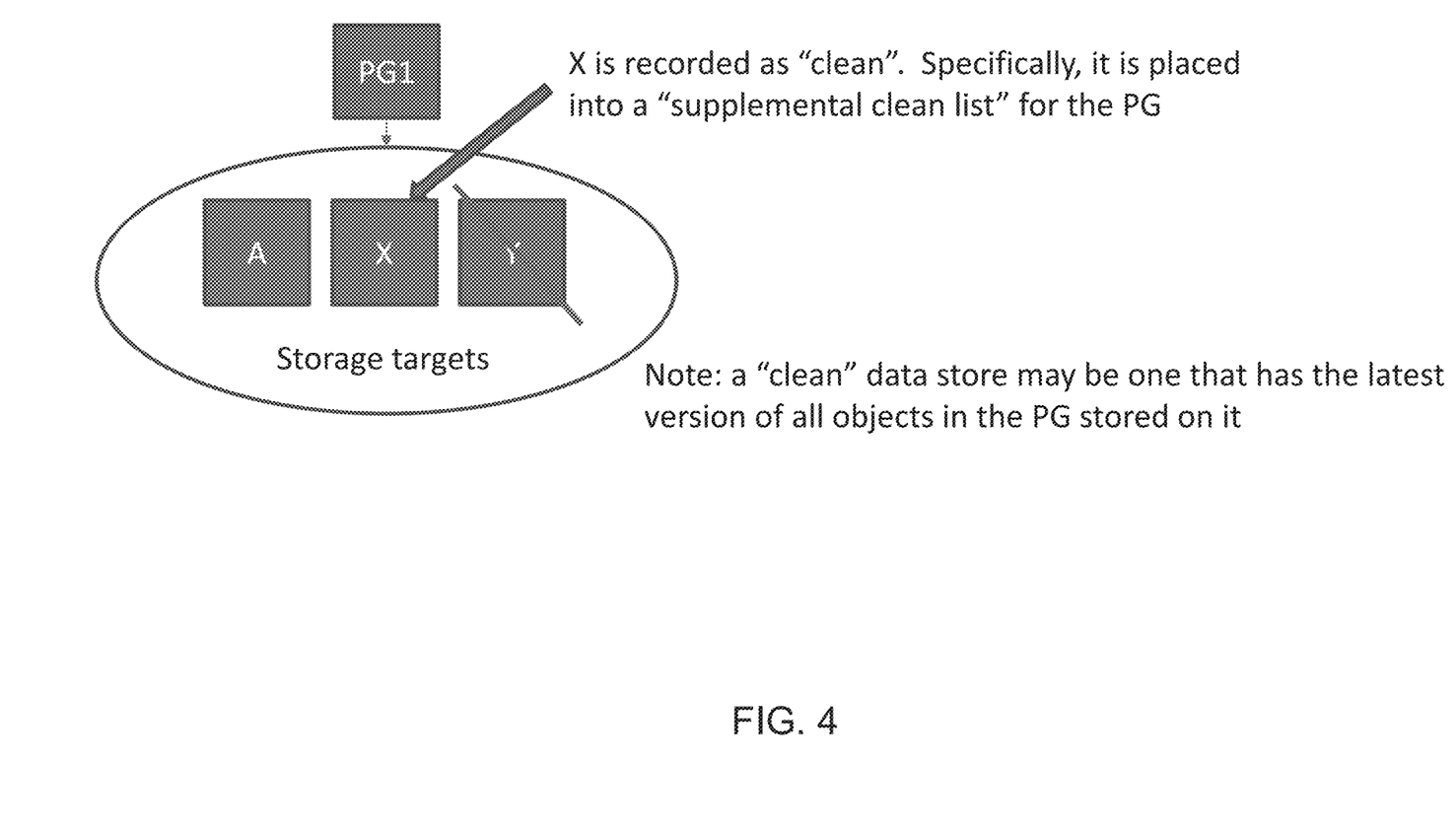
FIG. 4 illustrates a situation in which particular storage targets in a new assignment are designated as clean, according to an embodiment.

FIG. 4 illustrates a situation in which particular storage targets in a new assignment are designated as clean, according to an embodiment.

Referring to FIG. 4, PG1 includes newly assigned storage targets [A, X, Y]. However, newly assigned storage target Y may be offline. In this case, X may be denoted as a "clean" data store and placed into a supplemental clean list for PG1. A "clean" data store may be one that has the latest version of all objects in the PG stored on it. After putting a data store into the supplemental clean list, a PG may retain a dual assignment. Thus, the PG may retain a desired data protection level (e.g., 3). Additionally, X may remain in the supplemental clean list until one of two things happen, as described below with reference to FIGS. 5A-5B.

Figure 5A:
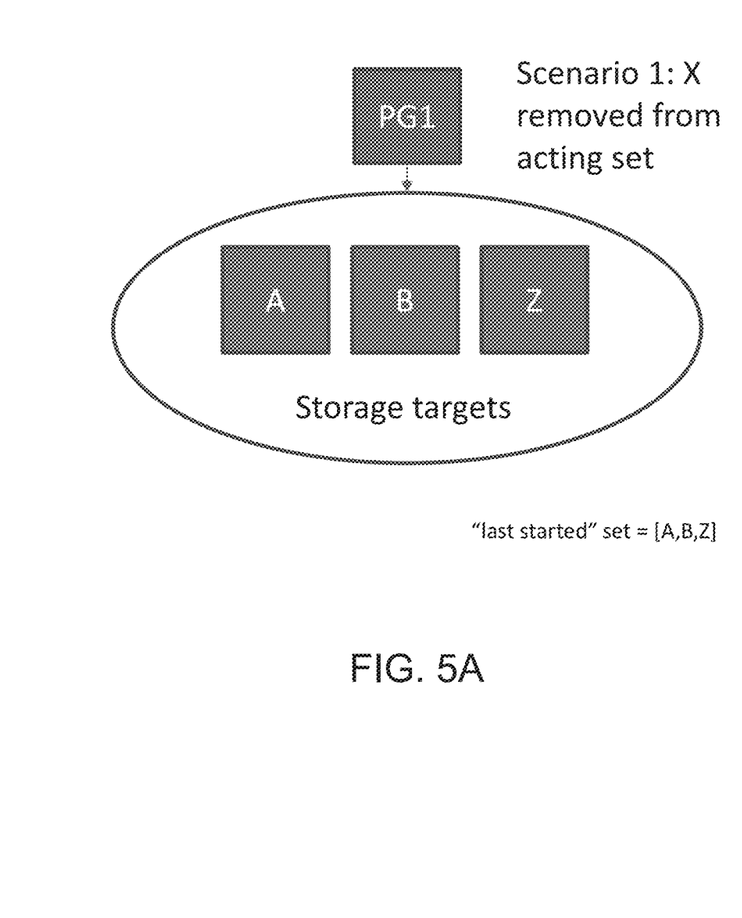
FIG. 5A illustrates a scenario in which a storage target X is removed from the acting data set, according to an embodiment.
Figure 5B:
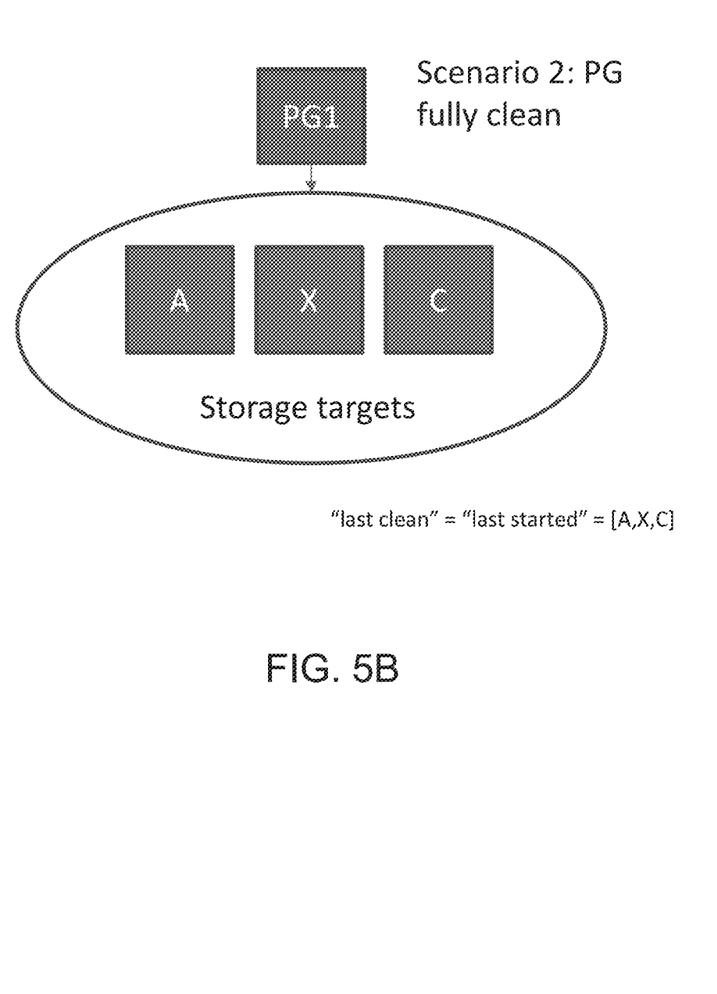
FIG. 5B illustrates a scenario in which a PG becomes fully clean, according to an embodiment.

FIG. 5A illustrates a scenario in which a storage target X is removed from the acting data set, according to an embodiment. FIG. 5B illustrates a scenario in which a PG becomes fully clean, according to an embodiment.

Referring to FIG. 5A, a first scenario in which X is removed from the supplemental clean list is shown. As shown in FIG. 5A, the last started set for PG1 is [A, B, Z]. In this case, X may be removed from the acting set the next time the PG is assigned to a set of data stores that does not include X, if it has not been used to "plug a hole" in the "last clean" set ("plug a hole" may refer to a data store in the supplemental clean list being used to replace a data store in a "last clean" set).

Referring to FIG. 5B, a second scenario in which X is removed from the supplemental clean list is shown. As shown in FIG. 5B, the "last started" set is equivalent to the "last clean" set, which is [A, X, C]. In this case, since PG1 is fully clean, X may be removed from the supplemental clean list.

Accordingly, use of the supplemental clean list provides a greater data protection level and, therefore, reduces the likelihood of data loss. In turn, this may reduce the amount of rebalancing processing that may need to take place because consistent hashing algorithms (e.g., CRUSH) may make it likely that data stores will be re-used in future PG assignments.

For example, with reference to FIGS. 5A-5B, clean data stores [B, C, X] may be included in a next assignment of PG1. Any data stores kept track of in the supplemental clean list will not require being brought up to date via a rebalance, and thus a minimal amount of rebalancing work will be required to bring PG1 up-to-date after the next assignment takes place. Additionally, the supplemental clean list may advantageously avoid using more complex solutions (e.g., state machines) to track the history of which data stores are up-to-date for which intervals.

Figure 6:
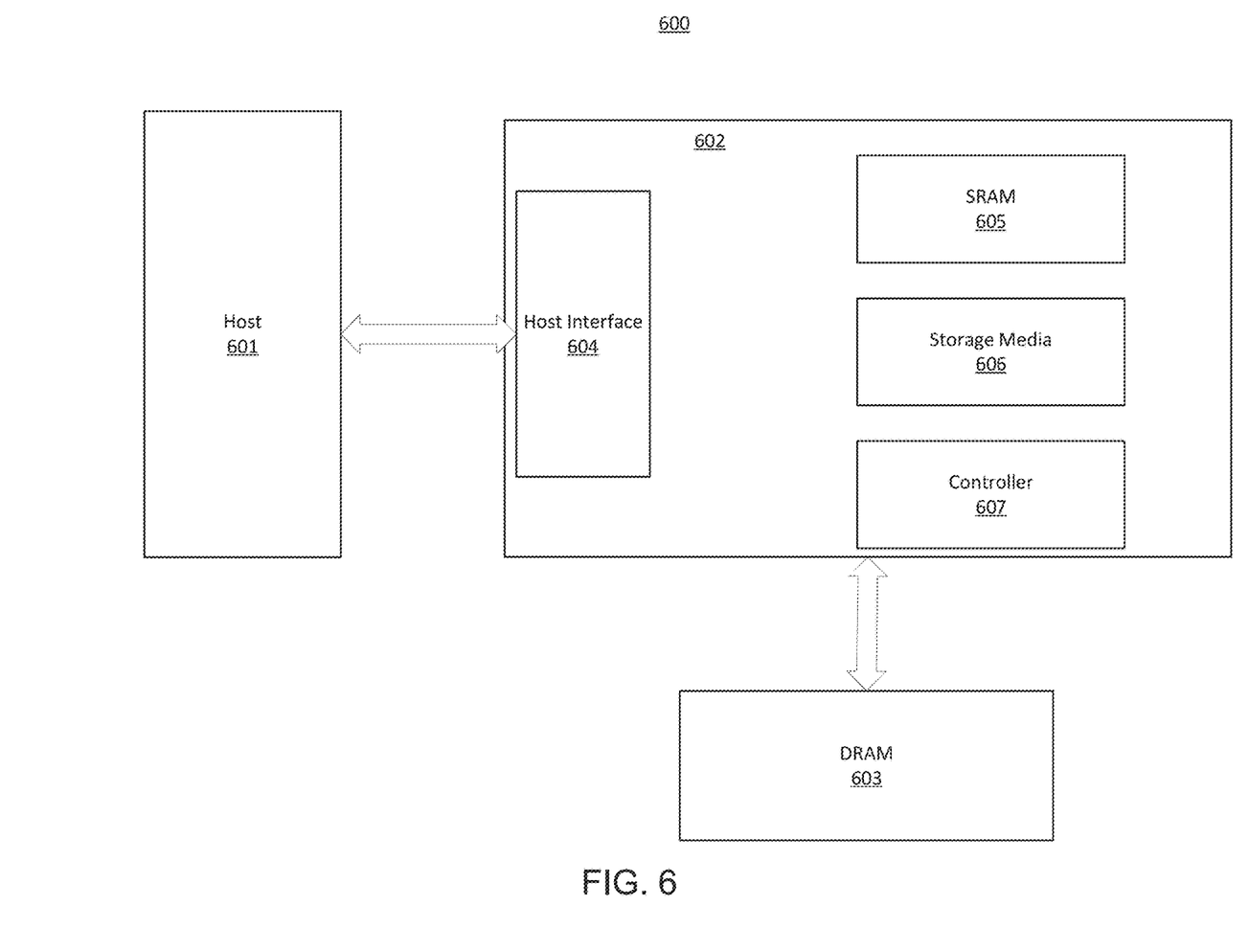
FIG. 6 is a memory system illustrating structural components for performing embodiments described in the present application, according to an embodiment.

FIG. 6 is a memory system illustrating structural components for performing embodiments described in the present application, according to an embodiment.

The operations described in FIGS. 1-5 may be performed by a controller stored in memory, a processor, or computer-implemented instructions. For instance, instructions performed by the controller may be implemented using as an FPGA, an ASIC, a general purpose computer, or by a remote processing system (e.g., a cloud computing system).

Referring to FIG. 6, a memory system 600 capable of performing the embodiments described in the present application is shown. The memory system 600 includes a host 601, an IC 602 (e.g., a memory buffer chip) and DRAM (e.g., a nonvolatile memory) 603. Although DRAM is shown separate from the IC 602, the DRAM may be included on the IC 602.

The IC 602 includes a host interface 604, SRAM (e.g., a volatile memory) 605, storage media (e.g., flash memory) 606 and a controller 607. The host interface 604 may communicate information from the host 601 to the IC 602 or from the IC 602 to the host 601. The SRAM 605 may be relatively small in size compared to the DRAM 603. However, the SRAM 605 may have faster read/write speeds than the DRAM 603. In addition, the storage media 606 may store data to be transmitted to or from the host 601 and/or the DRAM 603.

The embodiments described in the present application provide particular configurations to improve accessing stored information and, in particular, accessing stored information for disaggregated object storage systems. The storage system illustrated in FIG. 6 provides a structure for realizing the embodiments of the present application. It is noted, however, that the embodiments of the present application should not be limited to the structure of FIG. 6, as one of ordinary skill in the art would recognize that other memory storage systems may be applied to implement the embodiments of the present application.

Figure 7:
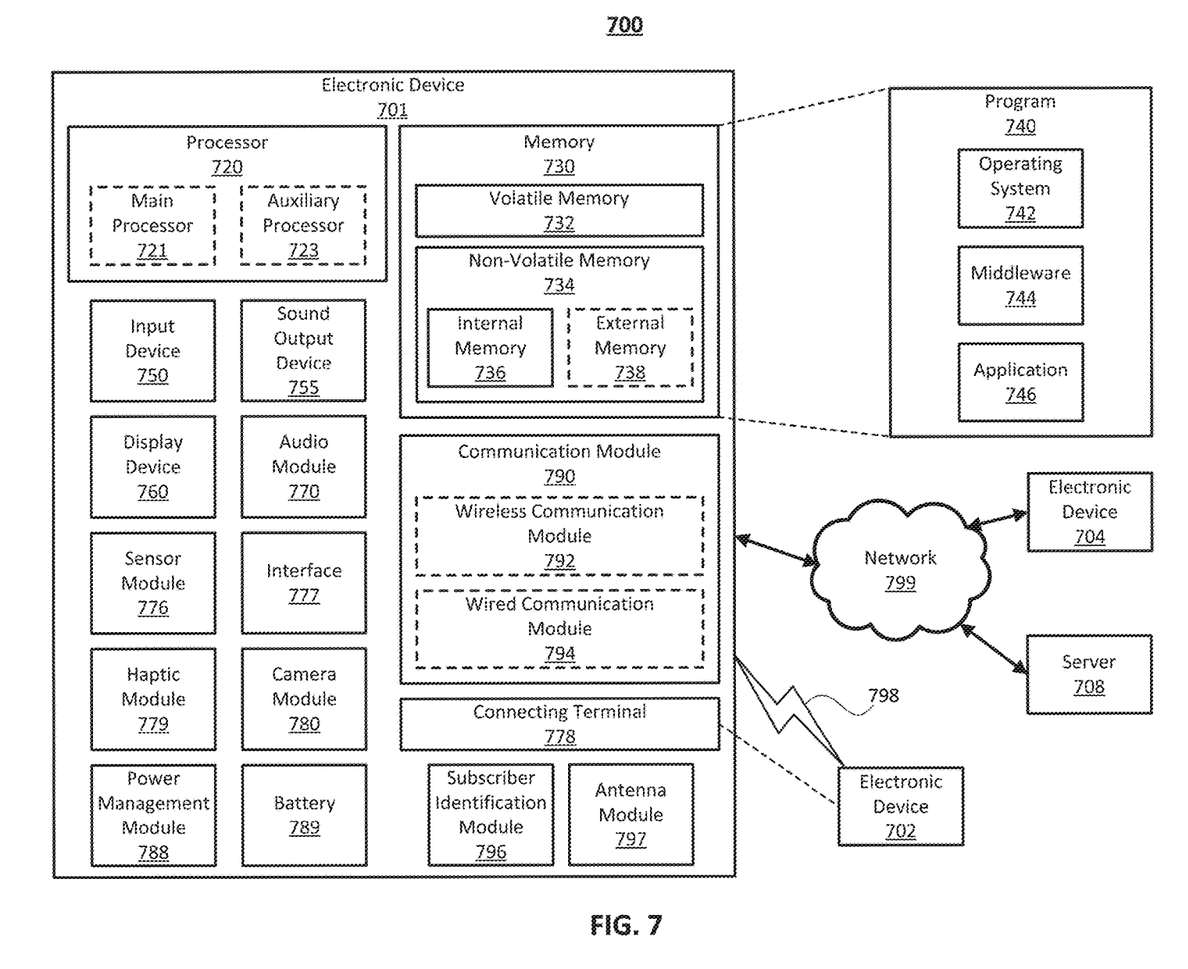
FIG. 7 illustrates an electronic device in a network environment, according to an embodiment.

FIG. 7 illustrates an electronic device in a network environment, according to an embodiment.

Referring to FIG. 7, the electronic device 701, e.g., a mobile terminal including GPS functionality, in the network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797 including a GNSS antenna. In one embodiment, at least one (e.g., the display device 760 or the camera module 780) of the components may be omitted from the electronic device 701, or one or more other components may be added to the electronic device 701. In one embodiment, some of the components may be implemented as a single IC. For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor, and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wiredly) or wirelessly. According to one embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. According to one embodiment, the haptic module 779 may include, for example, a motor, a piezoelectric element, or an electrical stimulator.

The camera module 780 may capture a still image or moving images. According to one embodiment, the camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor) and supports a direct (e.g., wired) communication or a wireless communication. According to one embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, instructions, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method comprising:
   generating a new storage target assignment for a placement group (PG) as a last started set, the PG comprising the last started set and a last clean set, wherein the last started set comprises a current set of storage targets assigned for the PG, and the last clean set comprises a set of storage targets assigned for the PG at a last time all data stores in its acting set of storage targets were online and up-to-date;
   performing a process to rebalance or add new data stores in the last started set;
   storing one or more of the new data stores in a supplemental clean list; and performing one or more update operations on the last started set, based on the supplemental clean list.

2. The method of claim 1, further comprising:
determining that the last started set is fully updated; and
in response to determining that the last started set is fully updated, updating a classification of the last started set to the last clean set.

3. The method of claim 2, wherein the last clean set is retained until the last started set is fully updated.

4. The method of claim 1, further comprising:
determining that the last started set is not fully updated; and
in response to determining that the last started set is not fully updated, maintaining the last started set, the last clean set, and the supplemental clean list.

5. The method of claim 1, further comprising performing rebalancing to bring new data stores in the last started set up-to-date.

6. The method of claim 5, further comprising, when rebalancing is complete, placing any new data stores in the last started set that are online into the supplemental clean list.

7. The method of claim 1, further comprising, if the PG is fully clean, assigning the last started set to the last clean set, and clearing the supplemental clean list.

8. The method of claim 1, further comprising, if the PG is not fully clean, maintaining the last started set to remain distinct from the last clean set, and retaining the supplemental clean list.

9. The method of claim 8, further comprising, upon generating a next storage target assignment for the PG, removing any data stores in the supplemental clean list when they no longer appear in the last started set or when the PG is fully clean.

10. The method of claim 9, wherein the PG is fully clean upon successfully completing a rebalancing operation.

11. A system, comprising:
a memory; and
a controller configured to:
generate a new storage target assignment for a placement group (PG) as a last started set, the PG comprising the last started set and a last clean set, wherein the last started set comprises a current set of storage targets assigned for the PG, and the last clean set comprises a set of storage targets assigned for the PG at a last time all data stores in its acting set of storage targets were online and up-to-date;
perform a process to rebalance or add new data stores in the last started set;
store one or more of the new data stores in a supplemental clean list; and
perform one or more update operations on the last started set, based on the supplemental clean list.

12. The system of claim 11, wherein the controller is further configured to:
determine that the last started set is fully updated; and
in response to determining that the last started set is fully updated, update a classification of the last started set to the last clean set.

13. The system of claim 12, wherein the last clean set is retained until the last started set is fully updated.

14. The system of claim 11, wherein the controller is further configured to:
determine that the last started set is not fully updated; and
in response to determining that the last started set is not fully updated, maintain the last started set, the last clean set, and the supplemental clean list.

15. The system of claim 11, wherein the controller is further configured to perform rebalancing to bring new data stores in the last started set up-to-date.

16. The system of claim 15, wherein the controller is further configured to, when rebalancing is complete, place any new data stores in the last started set that are online into the supplemental clean list.

17. The system of claim 11, wherein the controller is further configured to, if the PG is fully clean, assign the last started set to the last clean set, and clear the supplemental clean list.

18. The system of claim 11, wherein the controller is further configured to, if the PG is not fully clean, maintain the last started set to remain distinct from the last clean set, and retain the supplemental clean list.

19. The system of claim 18, wherein the controller is further configured to, upon generating a next storage target assignment for the PG, remove any data stores in the supplemental clean list when they no longer appear in last started set or when the PG is fully clean.

20. An electronic device, comprising:
a memory configured to store instructions; and
a processor configured to execute the instructions, causing the electronic device to:
generate a new storage target assignment for a placement group (PG) as a last started set, the PG including the last started set and a last clean set, wherein the last started set includes a current set of storage targets assigned for the PG, and the last clean set includes a set of storage targets assigned for the PG at a last time all data stores in its acting set of storage targets were online and up-to-date;
perform a process to rebalance or add new data stores in the last started set;
store one or more of the new data stores in a supplemental clean list; and
perform one or more update operations on the last started set, based on the supplemental clean list.

* * * * *